United States Patent [19]

Danver et al.

[11] Patent Number: 5,475,216

[45] Date of Patent: Dec. 12, 1995

[54] FIBER OPTIC SENSOR HAVING MANDREL WOUND REFERENCE AND SENSING ARMS

[76] Inventors: Bruce A. Danver, 18550 Hatteras St. #7, Tarzana, Calif. 91365; Jeffrey D. Lastofka, 4071 Liberty Canyon Rd., Agoura Hills, Calif. 91301

[21] Appl. No.: 526,816

[22] Filed: May 22, 1990

[51] Int. Cl.$^6$ .................................................... H01J 5/16
[52] U.S. Cl. ..................... 250/227.14; 367/149; 385/123
[58] Field of Search .......................... 250/227.14, 227.16, 250/227.17, 227.18, 231.1; 350/96.29; 367/149, 178

[56] References Cited

U.S. PATENT DOCUMENTS

| | | | |
|---|---|---|---|
| 3,645,603 | 2/1972 | Smith | 350/149 |
| 3,990,036 | 11/1976 | Savit | 340/15.5 |
| 4,162,397 | 7/1979 | Bucaro et al. | 250/199 |
| 4,166,946 | 9/1979 | Chown et al. | 250/199 |
| 4,294,513 | 10/1981 | Nelson et al. | 350/96.29 |
| 4,301,543 | 11/1981 | Palmer | 455/612 |
| 4,307,933 | 12/1981 | Palmer et al. | 455/612 |
| 4,307,937 | 12/1981 | Gordon | 350/96.29 |
| 4,322,829 | 3/1982 | Davis, Jr. et al. | 367/178 |
| 4,360,272 | 11/1982 | Schmadel et al. | 356/352 |
| 4,368,981 | 1/1983 | Ozeki | 356/352 |
| 4,378,143 | 3/1983 | Winzer | 350/96.15 |
| 4,442,350 | 4/1984 | Rashleigh | 250/227 |
| 4,443,700 | 4/1984 | Macedo et al. | 250/227 |
| 4,488,040 | 12/1984 | Rowe | 250/227.14 |

(List continued on next page.)

FOREIGN PATENT DOCUMENTS

| | | | |
|---|---|---|---|
| 0023345 | 2/1981 | European Pat. Off. | 250/227 X |
| 3224775 | 1/1983 | Germany | 350/96.16 X |
| 58-211119 | 12/1983 | Japan | 350/96.16 X |
| 2096762 | 10/1982 | United Kingdom | 250/227 X |
| WO79/00377 | 6/1979 | WIPO | 250/227 X |
| WO83/03684 | 4/1982 | WIPO | 356/350 X |
| WO85/00221 | 1/1983 | WIPO | 356/350 X |
| WO93/02496 | 6/1983 | WIPO | 356/350 X |

OTHER PUBLICATIONS

Brooks et al., "Coherence Multiplexing of Fiber–Optic Interferometric Sensors," Journal of Lightwave Technology, vol. LT-3, No. 5 Oct. 1985, pp. 1062–1071.

Jackson et al., "Optical Fiber Delay–Line Signal Processing," IEEE Transactions on Microwave Theory and Techniques, vol. MTT-33, No. 3, Mar. 1985, pp. 193–210.

Davis, "Fiber Optic Sensors: An Overview," Pro. of SPIE, Fiber Optic and Laser Sensors II, vol. 478, May 1984, pp. 12–18.

Pavlath, "Applications of All Fiber Technology to Sensors," Proc. SPIE, (Int. Soc. Opt. Eng.) vol. 412, 5–7, Apr. 1983, pp. 70–79.

Dandridge et al., "Homodyne Demodulation Scheme for Fiber Optic Sensors Using Phase Generated Carrier," IEEE Journal of Quantum Electronics, vol. QE-18, No. 10, Oct. 1982, pp. 1647–1653.

Kersey et al., "Demodulating Scheme Fibre Interferometric Sensors Employing Laser Frequency Switching," Electronics Letters, vol. 19, No. 3, Feb. 13, 1983, pp. 102–103.

Tur et al., "Fiber–optic Signal Processor with Applications to Matrix–vector Multiplication and Lattice Filtering," Optics Letters, vol. 7, No. 9, Sep. 1982, pp. 463–465.

(List continued on next page.)

*Primary Examiner*—David C. Nelms
*Assistant Examiner*—Que T. Le

[57] ABSTRACT

A fiber optic sensor is formed by providing a first mandrel section having a first longitudinal slot therein, placing a reference fiber within the slot and winding a sensing fiber around the first mandrel. The sensor includes a second mandrel section having a second longitudinal slot therein and a spacer between the first and second mandrel sections. The sensing fiber and the reference fibers are wound around the spacer, and then the reference fiber is placed in the second longitudinal slot. The sensing fiber is wound around the second mandrel section. The sensor may include additional mandrels and spacers to form additional sections. A plurality of sensing coils may be formed on each mandrel section.

14 Claims, 1 Drawing Sheet

U.S. PATENT DOCUMENTS

| | | | |
|---|---|---|---|
| 4,490,163 | 12/1984 | Jochem et al. | 65/4.21 |
| 4,493,528 | 1/1985 | Shaw et al. | 350/96.29 |
| 4,505,587 | 3/1985 | Haus et al. | 356/345 |
| 4,525,818 | 6/1985 | Cielo et al. | 367/149 |
| 4,530,603 | 7/1985 | Shaw et al. | 356/345 |
| 4,534,222 | 8/1985 | Finch et al. | 73/653 |
| 4,545,253 | 10/1985 | Avicola | 73/655 |
| 4,547,869 | 10/1985 | Savit | 367/149 |
| 4,552,457 | 11/1985 | Giallorenzi et al. | 356/345 |
| 4,570,248 | 2/1986 | Assord | 367/149 |
| 4,588,255 | 5/1986 | Tur et al. | 350/96.15 |
| 4,588,296 | 5/1986 | Cahill et al. | 356/350 |
| 4,593,385 | 6/1986 | Chamuel | 367/149 |
| 4,606,020 | 8/1986 | Ruffin | 370/3 |
| 4,630,885 | 12/1986 | Haavisto | 350/96.15 |
| 4,632,551 | 12/1986 | Pavlath | 356/345 |
| 4,633,170 | 12/1986 | Burns | 324/77 K |
| 4,648,082 | 3/1987 | Savit | 367/149 |
| 4,648,083 | 3/1987 | Giallorenzi | 367/149 |
| 4,653,916 | 3/1987 | Henning et al. | 356/345 |
| 4,671,113 | 6/1987 | Carome | 73/516 |
| 4,676,583 | 6/1987 | Hicks, Jr. | 350/96.15 |
| 4,676,585 | 6/1987 | Shaw et al. | 350/96.15 |
| 4,697,876 | 10/1987 | Dyott | 350/96.29 |
| 4,697,926 | 10/1987 | Youngquist et al. | 356/345 |
| 4,751,690 | 6/1988 | Krueger | 367/149 |
| 4,799,752 | 1/1989 | Carome | 350/96.15 |
| 4,848,906 | 7/1989 | Layton | 356/345 |
| 4,939,447 | 7/1990 | Bohnert et al. | 250/227.14 |
| 4,951,271 | 8/1990 | Garrett et al. | 367/149 |

OTHER PUBLICATIONS

Digonnet et al., "Analysis of a Tunable Single Mode Optical Fiber Coupler," IEEE Journal of Quantum Electronics, vol. AE–18, No. 4, Apr. 1982, pp. 746–754.

Giallorenzi et al., "Optical Fiber Sensor Technology," IEEE Transactions on Microwave Theory and Techniques, vol. MTT–30, No. 4, Apr. 1982, pp. 472–511.

Davis, "An Introduction to Fiber Optic Sensors," Laser Focus/Fiber Optic Tech., vol. 18, No. 2, Feb., 1982, pp. 112–118.

Jarzynski et al., "Frequency Response of Interferometric Fiber–optic Coil Hydrophones," Journal Acoust. Soc. Am., vol. 69, No. 6, Jun., 1981, pp. 1799–1808.

Nelson et al., "Passive Multiplexing Techniques for Fiber Optic Sensor Systems," I.F.O.C., Mar., 1981, pp. 27–30.

Nelson et al., "Passive Multiplexing Systems For Optic Sensors," Applied Optics, vol. 19, No. 17, Sep. 1980, pp. 2917–2920.

Sheem et al., "Wavelength Monitoring of Single–mode Diode Laser Using Guided Wave Interferometer," Optics Letters, May 1980, vol. 5, No. 5, pp. 179–181.

Bergh et al., "Single–Mode Fibre Optic Directional Coupler," Mar. 27, 1980, Electronics Letters, vol. 16, No. 7, pp. 260–261.

FIBER OPTIC SENSOR HAVING MANDREL WOUND REFERENCE AND SENSING ARMS

BACKGROUND OF THE INVENTION

This invention relates generally to apparatus and methods for sensing physical phenomena and particularly to fiber optic sensing systems. This invention relates particularly to fiber optic sensors that respond to changes in a selected field quantity such as pressure, magnetic field, electric field, etc. Still more particularly, this invention relates to fiber optic interferometric sensors that respond to underwater perturbations such as acoustic wavefronts by producing a phase difference in two light beams propagated by fiber optic material.

Optical fibers can be made sensitive to a large number of physical phenomena, such as acoustic waves and temperature fluctuations. An optical fiber exposed to such phenomena changes the amplitude, phase or polarization of light guided by the fiber. Optical fibers have been considered for use as sensing elements in devices such as microphones, hydrophones, magnetometers, accelerometers and electric current sensors.

A hydrophone array or acoustic sensor array may be formed as an integral, self-contained linear array of hydrophones on a single cable. Conventionally, such an array is made up of electromechanical transducer elements, principally piezoelectric devices, which generate electrical signals in response to pressure variations. These conventional sensors typically are active devices that require many electrical wires or cables. These sensors have the disadvantage of being susceptible to electrical noise and signal cross talk.

Fiber optic Mach-Zehnder and Michelson interferometers respond to the phenomenon being sensed by producing phase differences in interfering light waves guided by optical fibers. Detecting phase changes in the waves permits quantitative measurements to be made on the physical quantity being monitored.

A fiber optic Mach-Zehnder interferometer typically has a reference arm comprising a first length of optical fiber and a sensing arm comprising a second length of optical fiber. The sensing arm is exposed to the physical parameter to be measured, such as an acoustic wavefront, while the reference arm is isolated from changes in the parameter. When the Mach-Zehnder interferometer is used as an acoustic sensor, acoustic wavefronts change the optical length of the sensing arm as a function of the acoustic wave pressure amplitude. An optical coupler divides a light signal between the two arms. The signals are recombined after they have propagated through the reference and sensing arms, and the phase difference of the signals is monitored. Since the signals in the reference and sensing arms had a definite phase relation when they were introduced into the arms, changes in the phase difference are indicative of changes in the physical parameter to which the sensing arm was exposed.

A Michelson interferometer also has a sensing arm and a reference arm that propagate sensing and reference signals, respectively. However, in the Michelson interferometer these arms terminate in mirrors that cause the sensing and reference signals to traverse their respective optical paths twice before being combined to produce an interference pattern.

A hydrophone array is typically towed behind a ship. Towing causes vortexes, bubbles and other disturbances in the water that cause conventional hydrophones to give erroneous outputs. Most fiber optic hydrophones employ a matched Mach-Zehnder interferometer in the acoustic sensing system. One arm of the interferometer senses the acoustic field while the other arm is a reference. With a matched interferometer the reference arm can be placed next to the sensing arm so that any mechanical stresses applied to the sensing arm will also be applied to the reference arm.

A coating is applied to the jacket of the optical fiber in the reference arm to keep it from being sensitive to the acoustic field being measured. However, attempting to make the optical fiber in one arm of the interferometer insensitive to a particular physical parameter may also change other properties of the optical fiber. For example, coating the fiber jacket of one arm of the interferometer to change its sensitivity to the acoustic field changes the sensitivity of the optical fiber to acceleration. In such cases the effect of having matched arm lengths is not an advantage. Another difficulty with the matched pathlength interferometer is that coating the fiber jackets only partially eliminates the sensitivity of the fiber to the acoustic field and leaves a residual sensitivity that affects the performance of the sensor.

SUMMARY OF THE INVENTION

The present invention provides a mismatched pathlength fiber optic interferometer that has an inherent difference in the length of the sensing and reference arms. The arm length difference precludes the need to isolate the reference arm from the acoustic field. This difference in the length of the sensing and reference arms also permits the use of the reference arm as a device for cancelling out effects that accrue in the sensing arm. Keeping the jacket coatings the same on the reference arm and the sensing arm, allows the fibers to respond in the same manner. The sensitivity of the sensor is determined by the difference in the lengths of the two arms and by the type of material forming the mandrels around which the fibers are wrapped.

A method according to the present invention for forming a fiber optic sensor comprises the steps of providing a first mandrel section having a first longitudinal slot therein, placing a reference fiber within the slot and winding a sensing fiber around the first mandrel. The method of the invention also includes the steps of providing a second mandrel section having a second longitudinal slot therein, placing a spacer between the first and second mandrel sections, winding the sensing fiber and the reference fiber around the spacer, placing the reference fiber in the second longitudinal slot, and winding the sensing fiber around the second mandrel section.

The method of the present invention may further include the step of forming a plurality of sensing coils on each mandrel section. The method may also further include the steps of forming the first and second mandrel sections from nylon and forming the spacer from neoprene.

The method preferably includes the steps of providing a third mandrel, placing a spacer between the second and third mandrels, winding the sensing and reference fibers on the spacer, and winding the sensing fiber on the third mandrel.

DESCRIPTION OF THE PREFERRED EMBODIMENT

Figure 1:
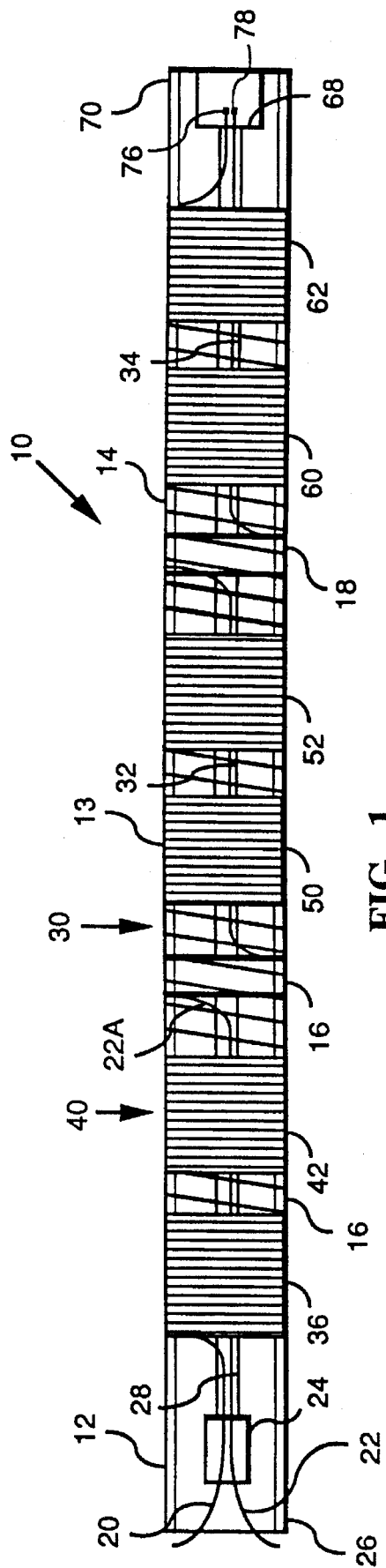
FIG. 1 is a schematic illustration of the fiber optic sensor according to the present invention.
Figure 2:
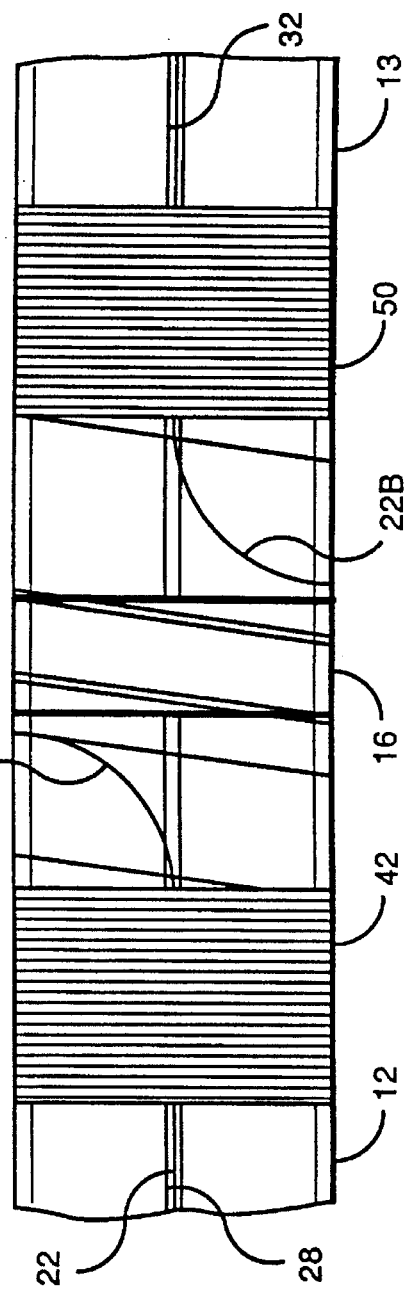
FIG. 2 illustrates reference and sensing fiber crossover between adjacent segments of the fiber optic sensor of FIG. 1.

Referring to FIG. 1, a passive fiber optic sensor 10 includes three tubes 12–14 preferably formed of a material such as nylon. In a presently preferred embodiment of the invention, the tube 12 has a length of 20 cm and the tubes 13 and 14 have lengths of 13.3 cm. Referring to FIGS. 1 and 2, a spacer 16, preferably formed of neoprene is placed between the tubes 12 and 13, and a similar spacer 18 is placed between the tubes 13 and 14.

The fiber optic sensor 10 may include a mismatched pathlength Michelson fiber optic interferometer similar to that disclosed in U.S. Pat. No. 4,848,906 to Layton, which is hereby incorporated by reference into the present disclosure.

Referring to FIG. 1, the fiber optic sensor 10 includes a sensing fiber 20 and a reference fiber 22. A 2×2 coupler 24 is mounted to the tube 12 near an end 26 for coupling light between the sensing fiber 20 and the reference fiber 22.

A suitable structure for the fiber optic coupler 24 is described in the Mar. 29, 1980 issue of *Electronics Letters*, Vol. 18, No. 18., pp. 260–261. The fiber optic coupler structure is also described in U.S. Pat. No. 4,493,518 issued Jan. 15, 1985 to Shaw et al. and assigned to the Board of Trustees of the Leland Stanford Junior University. The disclosure of U.S. Pat. No. 4,493,518 is hereby incorporated by reference into this disclosure.

A first slot 28 extends longitudinally along the tube 12 from the coupler 24 to the other end 30 of the tube 12. A second slot 32 extends the entire length of the tube 13, and a third slot 34 extends the entire length of the tube 14. The tubes 12–14 are placed end-to-end with the slots 28, 32 and 34 aligned with each other.

Referring to FIG. 1, both the sensing fiber 20 and the reference fiber 22 extend from the coupler 24 and are placed in the slot 28. A few centimeters from the coupler 24, the sensing fiber 20 is led out of the slot 28 and wrapped around the tube 12 to form a first sensing coil section 36 that extends along the length of the tube 12 for about 3 cm. The first sensing coil section 36 has a very small pitch. A portion 40 of the sensing fiber 20 is then wound on the tube 12 with a pitch much greater than the pitch of the coils in the first fiber coil 36. The sensing fiber 20 is then wound on the tube 12 to form a second sensing coil section 42 that is essentially identical to the sensing coil section 36. The distance along the tube 12 between the first and second coil sections 36 and 42 may conveniently be about 0.5 cm. The second sensing coil section 42 ends near the end 30 of the tube 12.

Referring to FIGS. 1 and 2, a portion 22A of the reference fiber 22 is led from the slot 28 near the end 30 of the tube 12. The sensing fiber 20 and the reference fiber 22 are then placed closely together and wrapped around the spacer 16. The pitch of the wraps of the combined sensing fiber 20 and reference fiber 22 around the spacer 16 is preferably much greater than the pitch of the wraps of the sensing fiber 20 around the tube 12 to form the sensing coil sections 36 and 42.

Still referring to FIGS. 1 and 2, the sensing fiber 20 and the reference fiber 22 are separated again after they are wrapped around the spacer 16. A portion 22B of the reference fiber 22 is placed in the slot 32 in the tube 13, and the sensing fiber 20 is wrapped around the tube 13 to form third and fourth sensing coil sections 50 and 52, which are essentially identical to the sensing coil sections 36 and 42.

The sensing fiber 20 and the reference fiber 22 are then held together and wrapped around the spacer 18 in the same way as they are wrapped around the spacer 16. After being wrapped around the spacer 18, the reference fiber 22 is placed in the slot 34 in the tube 14. The sensing fiber 20 is then wrapped around the tube 14 to form fifth and sixth sensing coil sections 60 and 62, respectively. Thus the sensing fiber 20 is wrapped around the tubes 12–14 in a manner that cancels out acceleration noise while allowing the fiber optic sensor 10 to operate in an extended mode.

When the sensing fiber 20 and the reference fiber 22 cross together between adjacent tubes, the fibers experience essentially the same stress, which cancels out noise generated at the interfaces between the tubes. Instead of being in the slots 28, 32 and 34, the reference fiber 22 may be wrapped with the sensing fiber 20, but in a much larger pitch, to cancel out acceleration noise generated in the sensing coil 20.

Referring to FIG. 1, a mirror slot 68 is formed at the end 70 of the fiber optic sensor 10 where the slot 34 ends. The sensing fiber 20 and the reference fiber 22 are both secured in the slot 34 so that the fibers extend into the mirror slot 68. A small mirror 76 connected to the end of the sensing fiber 20 reflects light emitted from the sensing fiber 20 back toward the coupler 24. Similarly, a small mirror 78 connected to the reference fiber 22 reflects light emitted from the reference fiber 22 back toward the coupler 24. The light beams then combine in the coupler 24 to produce an interference pattern.

The fiber optic sensor 10 operates with light from a light source such as a laser (not shown). Light pulses are injected into the input fiber of the sensor 10. For purposes of explaining the method of operation of the fiber optic sensor 10 the input fiber is assumed to be the sensing fiber 20. The coupler 24 then divides the input light into two beams of substantially equal intensity so that both the sensing fiber 20 and the reference fiber 22 guide light pulses from the light source. The optical path through the sensing fiber 20 is considerably longer than the optical path through the reference fiber 22. The fiber optic sensor 10 has been found to function satisfactorily when the pathlength difference is about 73 meters.

The input light travels to the mirrors 76 and 78 and reflects back to the coupler 24, which combines the optical signals directed toward it from the sensing fiber 20 and the reference fiber 22. The signals in the sensing fiber 20 and the reference fiber 22 have a definite phase relationship when they exit the coupler 24.

The lengths of the sensing fiber 20 and the reference fiber 22 change as they are exposed to an acoustic field. These changes in length cause phase changes in the optical signals in the sensing fiber 20 and reference fiber 22. If the length of one of the arms of the interferometer changes more than the length of the other, then a signal is generated when the beams recombine in the coupler 24. The generated optical signal may then be guided by the reference fiber 22 to a detector (not shown) for producing electrical signals that may be processed to determine the magnitude of the acoustic disturbance that generated the signal.

The structures and methods disclosed herein illustrate the principles of the present invention. The invention may be embodied in other specific forms without departing from its spirit or essential characteristics. Therefore, the described embodiments are to to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A method for forming a fiber optic sensor, comprising the steps of:

providing a first mandrel section having a first longitudinal slot therein;

placing a reference fiber within the slot;

winding a sensing fiber around the first mandrel;

providing a second mandrel section having a second longitudinal slot therein;

placing a spacer between the first and second mandrel sections;

winding the sensing fiber and the reference fiber around the spacer; and placing the reference fiber in the second longitudinal slot; and winding the sensing fiber around the second mandrel section.

2. The method of claim 1, further including the step of forming a plurality of sensing coils on each mandrel section.

3. The method of claim 1, further including the step of forming the first and second mandrel sections from nylon.

4. The method of claim 1, further including the step of forming the spacer from neoprene.

5. The method of claim 4, further including the step of forming the first and second mandrel sections from nylon.

6. The method of claim 1 further including the steps of:

winding the sensing fiber on the first mandrel section to form a first sensing coil and a second sensing coil; and winding the sensing fiber on the second mandrel section to form a third sensing coil and a fourth sensing coil.

7. The method of claim 1, further including the steps of:

providing a third mandrel;

placing a spacer between the second and third mandrels;

winding the sensing and reference fibers on the spacer; and winding the sensing fiber on the third mandrel.

8. A fiber optic sensor, comprising:

a first mandrel section having a first longitudinal slot therein;

a reference fiber placed within the first longitudinal slot;

a sensing fiber wound around the first mandrel section;

a spacer positioned adjacent an end of the first mandrel section with the sensing fiber and the reference fiber being wound together around the spacer; and a second mandrel section positioned adjacent the spacer such that the spacer is between the first and second mandrel sections, the second mandrel section having a second longitudinal slot therein, the reference fiber being placed in the second longitudinal slot and the sensing fiber being wound around the second mandrel.

9. The fiber optic sensor of claim 8, further including a plurality of sensing coils formed on each mandrel section.

10. The fiber optic sensor of claim 8 wherein the first and second mandrels are formed from nylon.

11. The fiber optic sensor of claim 8 wherein the spacer is formed from neoprene.

12. The fiber optic sensor of claim 11 wherein the first and second mandrels are formed from nylon.

13. The fiber optic sensor of claim 8 further including:

a first sensing coil and a second sensing coil formed in the sensing fiber on the first mandrel; and a third sensing coil and a fourth sensing coil formed in the sensing fiber on the second mandrel.

14. The fiber optic sensor of claim 8, further including:

a second spacer placed adjacent and end of the second mandrel section such that the second mandrel section is between the first and second spacers with the sensing fiber and the reference fiber being wound together around the second spacer; and a third mandrel section placed adjacent the second spacer such that the second spacer is between the second and third mandrel sections, the third mandrel section having a third longitudinal slot therein, the reference fiber being placed in the third longitudinal slot and the sensing fiber being wound around the third mandrel.

* * * * *

UNITED STATES PATENT AND TRADEMARK OFFICE
CERTIFICATE OF CORRECTION

PATENT NO. : 5,475,216
DATED : December 12, 1995
INVENTOR(S) : BRUCE A. DANVER and JEFFREY D. LASTOFKA It is certified that error appears in the above-indentified patent and that said Letters Patent is hereby corrected as shown below:

On the title page, item [54], and in column 1, lines 1-2, correct the title to read as shown below:

--FIBER OPTIC PLURAL SECTION SENSOR HAVING MANDREL WOUND REFERENCE AND SENSING ARMS--.

Signed and Sealed this

Second Day of April, 1996

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,475,216
DATED : December 12, 1995
INVENTOR(S) : BRUCE A. DANVER and JEFFREY D. LASTOFKA It is certified that error appears in the above-indentified patent and that said Letters Patent is hereby corrected as shown below:

Title page, item [54] and col. 1, line 1,

IN THE TITLE:

CORRECT TITLE TO READ:

--PASSIVE FIBER OPTIC PLURAL SECTION SENSOR HAVING MANDREL WOUND REFERENCE AND SENSING ARMS--

Signed and Sealed this

Fourth Day of June, 1996

*Attest:*

BRUCE LEHMAN

*Attesting Officer*    Commissioner of Patents and Trademarks